June 2, 1970 — S. TAMNY — 3,515,168
STREET CLEANER SUCTION SEAL
Filed May 31, 1968 — 2 Sheets-Sheet 1

INVENTOR.
SIMON TAMNY
By White & Haefliger
ATTORNEYS.

INVENTOR.
SIMON TAMNY
By White & Haefliger
ATTORNEYS.

United States Patent Office 3,515,168
Patented June 2, 1970

---

3,515,168
STREET CLEANER SUCTION SEAL
Simon Tamny, Los Angeles, Calif., assignor to Wayne Manufacturing Company, Pomona, Calif., a corporation of California
Filed May 31, 1968, Ser. No. 733,530
Int. Cl. F16l 25/00
U.S. Cl. 137—565                     9 Claims

ABSTRACT OF THE DISCLOSURE

The invention is directed to an air seal for incorporation in blower suction ducts of vehicular street cleaning equipment, the seal structure interposed between relatively movable duct sections employing a rectangular arrangement of rubber hose segments in mitered terminal interengagement and maintained in compressed deformation between the duct sections.

Background of the invention

Various specific types of street cleaning equipment employ the combination of a debris receiving chamber and a communicating suction blower operating to induce air flow into the chamber as a carrier or assist for the debris pickup. The chamber and blower are vehicle-mounted on structures which for reasons unnecessary to detail herein and known to those familiar with such equipment, may tolerate some relative movement of the chamber and blower.

Accordingly it has been a practice to interconnect the chamber and blower by a suction duct made in separable sections connected respectively to the chamber and blower, and to interpose between the sections an air seal permissive of relative movements of the sections in keeping with such relative movements of the chamber and blower as may occur.

The invention

The present invention is directed to improvements in such air seals, and has for its general object to reduce their construction to efficient and economical simplicity.

In brief, this object is achieved by forming the seal as a rectangular arrangement of straight rubber hose or equivalent segments in terminal mitered interengagement, the segments being mounted to one of the duct sections and compressively engaged against the other section in a state of ovoid-like compression to assure the air seal along the hose segments notwithstanding possible relative movements of the duct sections.

By virtue of the hose segment forms and their mitered interengagement, the seal becomes self-closing at the segment terminals in response to the pressure differential or gradient between atmospheric pressure outside the seal and the interior or duct suction pressure. Such differential causes the interengaged mitered ends of the hose segments to be pressed together to comlete the total air seal existing along the sides and at the terminals of the segments.

The invention contemplates various additional features having to do with mounting accommodation and deformed maintenance of the hose segments, all of which will be apparent without further preliminary references, from the following detailed description of an illustrative embodiment of the invention shown by the accompanying drawings, in which:

Description of the preferred embodiments

Figure 1:
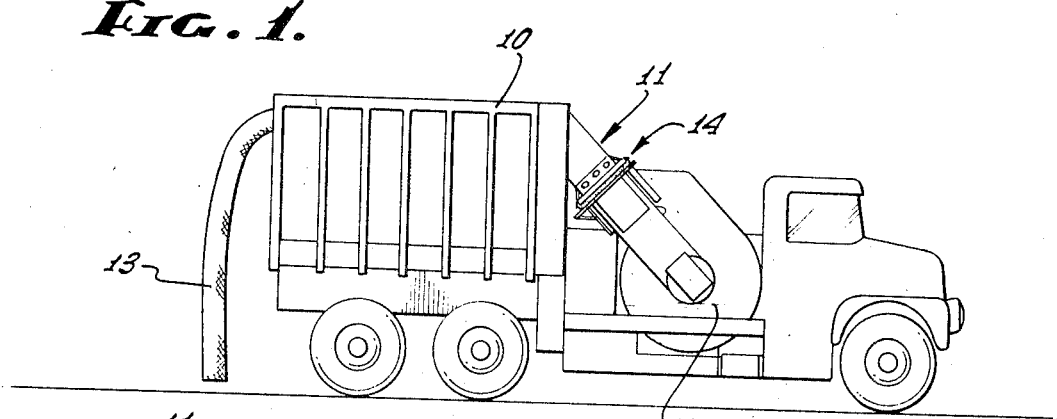
FIG. 1 is a view showing in side elevation illustrative vehicular street cleaning equipment embodying the invention.

In reference first to FIG. 1, the invention is shown to be employed in a street cleaning vehicle of the type comprising a truck chassis-mounted debris receiving chamber 10 connected by ducts generally indicated at 11, with a suction blower 12. Connected to chamber 10 is a flexible conduit 13 through which debris accumulations are displaced by blower-induced suction into the chamber 10. As previously indicated, the vehicular construction or responsiveness to road conditions may be such as to permit some relative movements between the blower 12 and chamber 10, a condition which occasions segmenting the suction duct 11 and interposing between the segments the air seal structure generally indicated at 14 and which is permissive of such relative movements.

Figure 2:
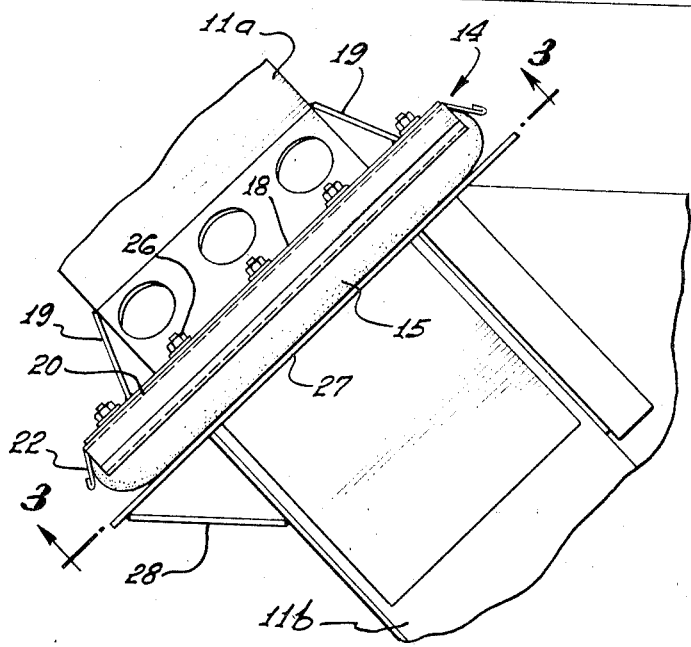
FIG. 2 is an enlarged fragmentary side elevation of the suction duct air seal structure.
Figure 3:
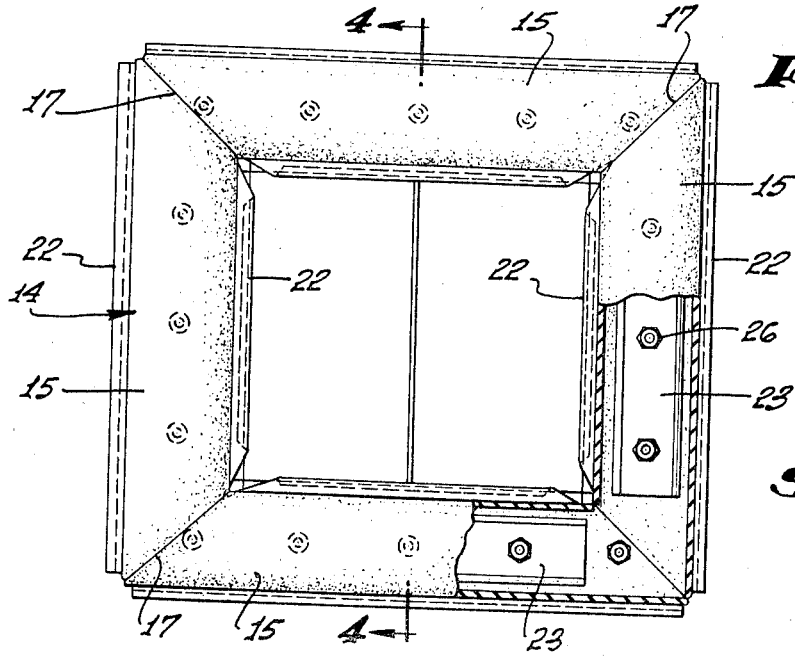
FIG. 3 is an enlarged section taken on line 3—3 of FIG. 2.
Figure 4:
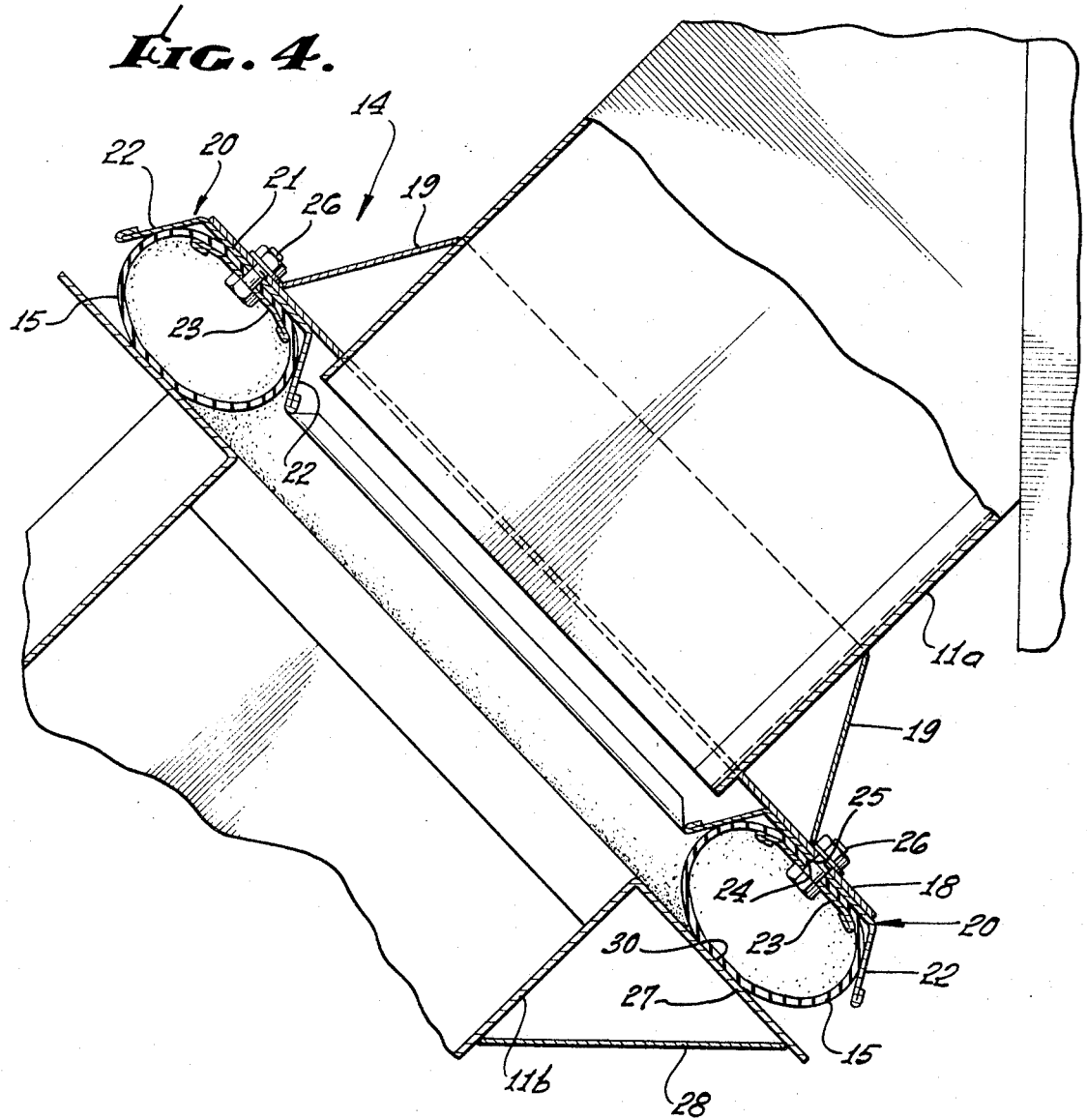
FIG. 4 is an enlarged section in the plane of line 4—4 in FIG. 3.
Figure 5:
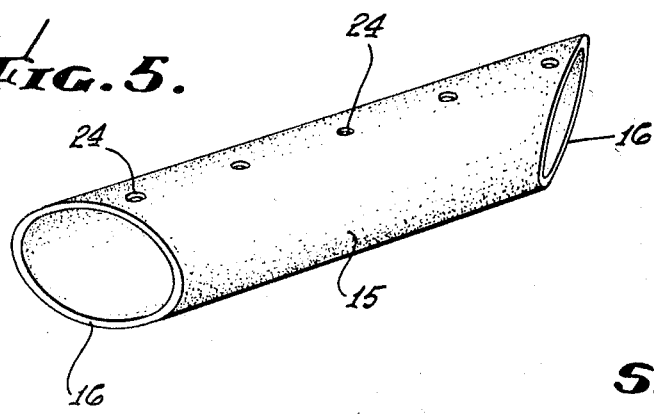
FIG. 5 is a view showing one of the seal hose segments.

As shown in FIGS. 2 to 4, the seal structure 14 is interposed between the upper and lower inclined duct sections 11a and 11b and comprises a rectangular arrangement, typically square, of individual hose segments 15, see FIG. 5, the ends 16 of which are cut or formed at 45° angularlity so that when assembled and as viewed in FIG. 3 the segments terminally interengage along mitered corners 17.

The segments may be mounted to either of the duct sections, illustratively section 11a by means of the duct plate flange 18 braced by gussets 19 for rigidity, The flange 18 carries a channel 20 extending rectangularly about the duct in conformance with the hose segment assembly, the channel being formed with a base 21 bearing flatly against the duct flange and having outwardly divergent sides 22. Each of the hose segments 15 contains a supporting clamp plate 23 connected to flange 18 through the hose and channel holes 24 and 25 by suitable fasteners such as bolts 26. Upon tightening the bolts, both the hose segments and channel become securely clamped in fixed position between plates 23 and the flange 18.

The assembled hose segments bear against the flat terminal flange of the lower duct section 11b, the flange if necessary being suitably braced as at 28. The spacing between the duct section terminals, and more specifically the spacing between flange 27 and the base of channel 20, is such that the hose segments are confined in a state of lateral compression or deflection as into ovoid-like shapes in which the segments may have engaged confinement between the channel sides 22 and have flattened bearing at 30 against flange 27. Being thus held in a state of resilient deformation and confinement between the channel and flange 27, the segments maintain throughout their lengths a seal against inflow of atmospheric air into the lower pressure suction duct, and they also by reason of their combined resilient flexibility both axially and transversely of the duct sections, permit corresponding relative duct section movements while always maintaining the seal.

A particular feature is the interengagement of the hose segments at the mitered terminals and corners 17, thus to render the segments self-sealing together along the miters in response to air pressure differential outside the seal assembly and within the suction duct. That is to say, during blower operation the induced pressure inside the duct creates with the greater outside atmospheric pressure a differential which acts to press together the angular terminals of the segments along the miters, thus to seal against consequential entry of outside air into the duct throughout the rectilinear extent of the hose assembly.

I claim:

1. In street cleaning equipment, an air seal exposed at its inside to suction pressure and formed by a rectangular arrangement of separate open rubber hose segments in terminal mitered interengagement, means communicating suction to the inside of said seal, and means engaging opposite sides of the segments and maintaining them in compressively deformed shape, pressure differential between inside and outside said sections acting to press together the mitered ends of the segments.

2. Equipment according to claim 1, in which said engaging means comprises a first flange coextensive with said segments, means attaching the hose segments to said flange, and a second flange spaced from the first flange and engaged by said segments.

3. Equipment according to claim 2, in which said attaching means include supporting members inside the hose segments and connected through the segments to said first flange.

4. Equipment according to claim 1, in which said seal is between relatively movable sections of a duct connecting a suction blower with a debris chamber.

5. Equipment according to claim 4, in which said attaching means include supporting members inside the hose segments and connected through the segments to said first flange.

6. Equipment according to claim 4, in which said engaging means comprises a rectangular channel carried by said first flange about one of the duct sections and containing the hose segments, said second flange being on and about the other duct section and engaged by said segments.

7. Equipment according to claim 6, in which the channel sides are divergent and are engaged by the compressively deformed segments.

8. Equipment according to claim 7, in which said second flange is in the form of an essentially flat plate.

9. Equipment according to claim 8, in which the hose segments contain supporting members secured through the segments to said channel.

References Cited

UNITED STATES PATENTS

| | | | |
|---|---|---|---|
| 588,351 | 8/1897 | Pierce | 285—9 |
| 2,974,079 | 3/1961 | Korotkevich | 277—226 |

OTHER REFERENCES

Central Engineering Co., Bulletin V-3, "Vac All, Vacuum Street Cleaner," Milwaukee, Wis., received Feb. 25, 1965, p. 8.

M. CARY NELSON, Primary Examiner

R. B. ROTHMAN, Assistant Examiner

U.S. Cl. X.R.

15—340; 277—166; 285—9